United States Patent [19]
Taicher et al.

[11] Patent Number: 6,018,243
[45] Date of Patent: Jan. 25, 2000

[54] NMR WELL LOGGING APPARATUS AND METHOD

[75] Inventors: Gersh (Zvi) Taicher; Arcady Reiderman, both of Houston, Tex.

[73] Assignee: Western Atlas International, Inc., Houston, Tex.

[21] Appl. No.: 08/960,498

[22] Filed: Oct. 29, 1997

[51] Int. Cl.$^7$ ........................................................ G01V 3/00
[52] U.S. Cl. ............................ 324/303; 324/300; 335/306
[58] Field of Search ...................................... 324/303, 306, 324/318, 322, 300; 335/306

[56] References Cited

U.S. PATENT DOCUMENTS

| | | | |
|---|---|---|---|
| 5,488,342 | 1/1996 | Hanley | 335/306 |
| 5,646,528 | 7/1997 | Hanley | 324/303 |

*Primary Examiner*—Christine K Oda
*Assistant Examiner*—Brij B. Shrivastav
*Attorney, Agent, or Firm*—Richard A. Fagin

[57] ABSTRACT

A nuclear magnetic resonance well logging apparatus including a magnet for inducing a static magnetic field in a substantially cylindrically shaped sector located in earth formations penetrated by a wellbore. The sector subtends an angle of about 60 degrees. The sector is located only on one side of the wellbore and has a longitudinal axis substantially parallel to the wellbore. The apparatus also includes a transmitter for generating a radio frequency magnetic field in the sector for exciting nuclei. The radio frequency magnetic field and the static magnetic field substantially satisfy nuclear magnetic resonance excitation conditions substantially exclusively within the sector. The apparatus includes a receiver for detecting nuclear magnetic resonance signals from the excited nuclei. In one embodiment of the invention, the static magnetic field has a longer dimension along the longitudinal axis than the active length of the transmitter, and the active length of the transmitter is greater than the active length of the receiver so that only fully polarized nuclei are excited by the radio frequency magnetic field and NMR signals are detected only from fully radio frequency-excited nuclei.

9 Claims, 11 Drawing Sheets

NMR WELL LOGGING APPARATUS AND METHOD

BACKGROUND OF THE INVENTION

1. Field of the Invention

The invention is related to the field of nuclear magnetic resonance ("NMR") apparatus and measuring techniques. More specifically, the invention is related to well logging apparatus and measuring techniques for NMR measurement within earth formations penetrated by a wellbore.

2. Description of the Related Art

NMR well logging instruments typically include a permanent magnet to induce a static magnetic field in the earth formations and a transmitting antenna, positioned near the magnet and shaped so that a pulse of radio frequency (RF) power conducted through the antenna induces an RF magnetic field in the earth formation. The RF magnetic field is generally orthogonal to the static magnetic field. After an RF pulse, voltages are induced in a receiving antenna positioned near the magnet by precessional rotation of nuclear spin axes of hydrogen or other nuclei about the static magnetic field. The receiving antenna is typically connected to a receiver which detects and measures the induced voltages.

In a typical NMR measurement set a sequence of RF pulses is applied and a sequence of voltages is measured. The magnitudes of the voltages and the rates at which the voltages vary are related to certain petrophysical properties of the earth formation. These properties can include the fractional volume of pore space, the fractional volume of mobile fluid filling the pore spaces of the earth formations and other petrophysical parameters. Methods and measurement techniques for using NMR measurements to determine the fractional volume of pore space, the fractional volume of mobile fluid and other petrophysical parameters are described, for example, in *Spin Echo Magnetic Resonance Logging: Porosity and Free Fluid Index Determination*, M. N. Miller et al, Society of Petroleum Engineers paper no. 20561, Richardson, Tex., 1990 and in *Field Test of an Experimental Pulsed Nuclear Magnetism Tool*, C. E. Morriss et al, SPWLA Transactions 1993, paper GGG.

One NMR well logging instrument is described, for example, in U. S. Pat. No. 3,597,681 issued to Huckbay et al. A drawback to the apparatus disclosed in the Huckbay et al '681 patent is that a region of unidirectional magnetic field (the "sensitive region") induced in the formation by the magnet is not homogeneous along the wellbore axis. Logging tools typically must be able to move axially through the wellbore while performing measurements. During the time needed to make a typical NMR measurement set the sensitive region will change its position before the measurement set can be completed, leading to error in the measurements. Another drawback to the apparatus disclosed in the Huckbay et al '681 patent is that a significant part of the NMR signal can originate within a fluid ("drilling mud") filling the wellbore. Another drawback to the apparatus disclosed in the Huckbay et al '681 patent is that the RF magnetic field decreases in amplitude with respect to the third power of the distance between the antenna and the sensitive region, as the antenna can be modeled as the equivalent of a three dimensional magnetic dipole. Such an antenna is proximally coupled to only a small part of the unidirectional static magnetic field. This results in an extremely low signal-to-noise ratio. Another drawback to the apparatus disclosed in the Huckbay et al '681 patent is that the antenna is subjected to a very high static magnetic field strength and will have an unacceptably large amount of magnetoacoustic ringing as a result.

Another type of NMR well logging apparatus is described in U.S. Pat. No. 4,350,955 issued to Jackson et al. The apparatus disclosed in the Jackson et al '955 patent includes permanent magnets configured to induce a static magnetic field in the earth formations which has a toroidal volume of substantially uniform magnetic field strength. A particular drawback to the apparatus disclosed in the Jackson et al '955 patent is that the thickness of the toroidal volume is very small relative to typical rates of axial motion of well logging tools. Well logging tools, in order to be commercially useful, typically must be able to be moved axially through the wellbore at rates not less than about ten feet per minute. The length of time needed to make a typical NMR measurement set can be as long as several seconds. The NMR logging tool is therefore likely to move a substantial distance during a measurement cycle. Measurements made by the apparatus disclosed in the Jackson et al '955 patent are therefore subject to error.

Another drawback to the apparatus disclosed in the Jackson et al '955 patent is that it does not eliminate NMR signal originating within the fluid filling the wellbore. A still further drawback to the apparatus disclosed in the Jackson et al '955 patent is that the toroidally shaped static magnetic field is subject to changes in field strength as the instrument is subjected to changes in ambient temperature and variances in the earth's magnetic field. The antenna in the Jackson et al '955 apparatus is tuned to a single frequency. If the field strength of the static magnetic field in the toroidal volume changes, the antenna may no longer be sensitive to NMR signals originating within the toroidal volume. Using the apparatus in Jackson et al '955, it is impractical to compensate the frequency of the RF magnetic field for changes in the static magnetic field strength within the toroidal volume.

Additional drawbacks to the apparatus disclosed in the Jackson et al '955 patent are as follows. Since the magnet pole pieces are in opposed polarity to each other, there is a significant demagnetizing effect which requires a permanent magnet material having high coercive force. This requirement is opposite to the strong residual magnetization and high temperature stability of magnetic properties required of the permanent magnet. The magnet pole pieces are significantly spaced apart and far from the magnetic field's homogeneous region, which makes the usage of the permanent magnet material less cost-effective. Low antenna efficiency is a result of low electro-magnetic coupling between the antenna and the earth formation at resonance. The antenna is located in a relatively strong magnetic field, which stimulates strong magnetoacoustic ringing in the antenna. Because it uses a homogeneous magnetic field, any changes in the orientation of the apparatus with respect to the earth magnetic's field can result in a significant disturbance to the homogeneity of the static magnetic field. Furthermore, some techniques for diffusion measurement require a substantial magnetic field gradient in the static magnetic field, which are made impossible by the homogeneous static magnetic field of the Jackson et al '955 apparatus.

Another type of NMR well logging apparatus is described in U.S. Pat. No. 4,717,876 issued to Masi et al. The apparatus disclosed in the Masi et al '876 patent has a "toroidal" static magnetic field providing improved homogeneity in the toroidal region as compared to apparatus in the Jackson et al '955 patent, but the Masi et al apparatus has basically the same drawbacks as the Jackson et al apparatus.

Another type of NMR well logging apparatus is described in U.S. Pat. No. 4,629,986 issued to Clow et al. This apparatus provides improved signal-to-noise ratio, when compared to the apparatus of the Jackson et al '955 patent, by including a high magnetic permeability ferrite in the antenna. Increased stability is achieved by having a static magnetic field gradient as part of the static magnetic field in the sensitive region. However, the apparatus disclosed in the Clow et al '986 patent has the following drawbacks. Since the magnetic properties of the permanent magnet material are temperature dependent, the sensitive region is not stable in shape and field intensity. The sensitive region is only a couple of inches long in the longitudinal direction, which requires this tool to be practically motionless during an NMR measurement cycle. Magnet pole pieces are significantly spaced apart and far from the homogeneous field region, which makes the usage of permanent magnet material not cost-effective. The antenna is located in a relatively strong static magnetic field, which stimulates magnetoacoustic ringing in the antenna. The high magnetic permeability ferrite in the antenna is located in a relatively strong magnetic field which may saturate the ferrite and reduce its efficiency. Soft ferrite in a static magnetic field is also a strong source of magnetostrictive ringing following each RF pulse. In the magnet arrangement disclosed by Clow et al the demagnetizing field is substantially strong, which requires magnet material having a high coercive force. This requirement is opposite to the strong residual magnetization and high temperature stability of magnetic properties required of the permanent magnet. The static magnetic field in the earth formation at resonance is only about 10 Gauss and rotates 360° in a plane perpendicular to the wellbore axis. For this level of static magnetic field, the earth's magnetic field of about 0.5 Gauss presents a significant disturbance to the static field induced by the magnet.

Another type of NMR well logging apparatus is described in U.S. Pat. No. 4,717,878 issued to Taicher et al provides azimuthal resolution with respect to the wellbore axis and reduction of spurious signal from wellbore fluid. However, the apparatus disclosed in the Taicher et al '878 patent has the following drawbacks. Since the magnetic properties of the permanent magnet material are temperature dependent, the sensitive region is not stable in shape and field intensity. The antenna is located in a relatively strong magnetic field, which stimulates magnetoacoustic ringing in the antenna. In the magnet arrangement disclosed by Taicher et al, the demagnetizing field is very strong, which requires a magnet material having high coercive force. This requirement is opposite to the strong residual magnetization and high temperature stability of magnetic properties required of the permanent magnet. Due to the disadvantages of the foregoing NMR well logging instruments, none of them generally has become commercially accepted.

One NMR well logging apparatus which has become commercially accepted is described in U.S. Pat. No. 4,710,713 issued to Taicher et al. The apparatus disclosed in the Taicher et al '713 patent includes a substantially cylindrical permanent magnet assembly which induces a static magnetic field having substantially uniform field strength within an annular cylindrical volume. The apparatus disclosed in the Taicher et al '713 patent, however, has several drawbacks. First, the antenna induces an RF magnetic field in the formations surrounding the tool which decreases in strength as the square of the radial distance from the axis of the magnet. Moreover, a significant portion of the RF energy can be lost in an electrically conductive fluid in the wellbore. Because the signal-to-noise ratio of NMR measurements made in a gradient magnetic field is typically related to the strength of the RF magnetic field, the apparatus disclosed in the Taicher et al '713 has large electrical power requirements and can have difficulty obtaining measurements having sufficient signal-to-noise ratio at substantial radial distances from the axis of the instrument.

Another drawback to the instrument described in the Taicher et al '713 patent is that the optimum design of the magnet and the RF antenna requires the resonance conditions to be met at a relatively high frequency to obtain a suitable signal-to-noise ratio. Since the RF energy losses in the fluid in the wellbore (if it is conductive) are proportional to the square of the frequency, the operation of the Taicher et al '713 patent is generally restricted to operating in a low electrical conductivity wellbore fluid.

Another drawback to the apparatus described in the Taicher et al '713 patent is that the optimum design of the magnet and the RF antenna requires the sensitive volume to be at about 12 inches to 15 inches in diameter in order to provide acceptable signal-to-noise ratio. Many wellbores are inclined from vertical and logging tools cannot be ideally centralized in such wellbores. Moreover, the wellbore can sometimes have a very large internal diameter as a result of "washouts" or similar effects known in the art. For wellbores having a nominal diameter of larger than about 10 inches, and particularly those highly inclined form vertical, the sensitive volume of this apparatus may be positioned at least partially within the wellbore itself rather than wholly within the earth formation leading to errors in the measurement.

Yet another drawback to the apparatus described in the Taicher et al '713 patent is that the antenna is located in a relatively strong magnetic field, which is perpendicular to a direction of RF current flow in the transmitting antenna and, therefore, stimulates magnetoacoustic ringing in the transmitting antenna.

Another commercially accepted NMR logging apparatus is described in U.S. Pat. No. 5,055,787 issued to Kleinberg et al. This logging instrument includes permanent magnets arranged to induce a magnetic field in the earth formation having substantially zero static magnetic field gradient within a predetermined sensitive volume. The magnets are arranged in a portion of the tool housing which is typically placed in contact with the wall of the wellbore. The antenna in this logging instrument is positioned in a recess located external to the tool housing, enabling the tool housing to be made from a high strength material such as steel. A drawback to the instrument described in the Kleinberg et al '787 patent is that its sensitive volume is only about 0.8 cm away from the tool surface and extends only to about 2.5 cm radially outward from the tool surface. Measurements made by this instrument are therefore subject to large error caused by, among other things, roughness in the wall of the wellbore, by deposits of the solid phase of the drilling mud (called "mudcake") onto the wall of the wellbore in any substantial thickness, and by the fluid content of the formation in the "invaded zone" (typically defined as the zone in which the liquid phase of the drilling mud infiltrates the pore spaces of the formation proximal to the wellbore).

Another drawback to the apparatus disclosed in the Kleinberg et al '787 patent relates to the magnet material used. Since the magnet pole pieces are opposed each other, there is a strong demagnetizing effect which requires a magnet material having a high coercive force. This requirement is opposite to the strong residual magnetization and high temperature stability of magnetic properties required of the permanent magnet.

All of the prior art NMR well logging instruments described herein typically have antennas for generating the RF magnetic field and for receiving the NMR signals which are substantially the same length as the axial extent of the static magnetic field. A drawback to prior art NMR apparatus having such antenna dimensions is that measurements made in which the instrument is moving are subject to significant error. The first source of error is that the RF magnetic field may be generated in a region different from that which is completely "prepolarized" by the static magnetic field. A second source of error is that the receiving antenna may be sensitive to an axial region which is different from the axial region in which the NMR signal is likely to originate, as the instrument is axially moved during measurement.

Prior art NMR well logging instruments have a common drawback as explained, for example, in U.S. Pat. No. 5,332,967 issued to Shporer. This drawback is related to a significant phase shift of the NMR signal, which leads to significant distortion of the signal height and may even lead to a complete disappearance of the signal, when the logging apparatus is moving in a direction along a static magnetic field magnitude gradient. This signal reduction may become even more pronounced when the speed of motion of the instrument is variable and uncontrolled. Causes of variation in the speed of motion of a logging instrument are well known in the art.

SUMMARY OF THE INVENTION

The invention is a nuclear magnetic resonance well logging apparatus including a magnet for inducing a static magnetic field in a substantially cylindrically-shaped sector. The sector is located substantially entirely within earth formations penetrated by a wellbore. The sector subtends an angle around the axis of the cylinder of about 60 degrees, and the sector is located only on one side of the wellbore. The longitudinal axis of the sector is substantially parallel to the wellbore. The apparatus also includes a transmitter for generating a radio frequency magnetic field in the sector for exciting nuclei of the earth formations. The radio frequency magnetic field and the static magnetic field satisfy nuclear magnetic resonance excitation conditions substantially exclusively within the sector. The apparatus further includes a receiver for detecting nuclear magnetic resonance signals from the excited nuclei. In one embodiment of the invention, the static magnetic field has a longer dimension in the sector along the longitudinal axis in the direction of motion of the apparatus than the active length of the transmitter, and the active length of the transmitter is greater than the active length of the receiver in the direction of motion so that nuclear magnetic resonance is excited only in substantially fully polarized nuclei, and NMR signals are detected only from substantially fully radio frequency-excited nuclei.

In a particular embodiment of the invention, the transmitter includes two substantially identical antenna coils having sensitive axes rotated 90 degrees with respect to each other, and the coils are energized by RF power sources having a 90 degree phase shift between them to induce a circularly polarized RF magnetic field in the sector. In the particular embodiment, the receiver includes two substantially identical coils having sensitive axes rotated 90 degrees with respect to each other, and the receiver includes circuits for phase-sensitive quadrature detection of the NMR signals.

The preferred embodiment of the invention comprises a permanent magnet assembly having two opposed polarity permanent magnets polarized along the longitudinal axis of the instrument. The magnets have dimensions selected to induce a static magnetic field within the sector which has radial and longitudinal amplitude gradients specifically related to a speed of motion of the logging instrument along the wellbore and an expected speed of radial motion of the logging instrument within the wellbore.

DESCRIPTION OF THE PREFERRED EMBODIMENT

1. Overall Configuration of the Well Logging Apparatus

Figure 1:
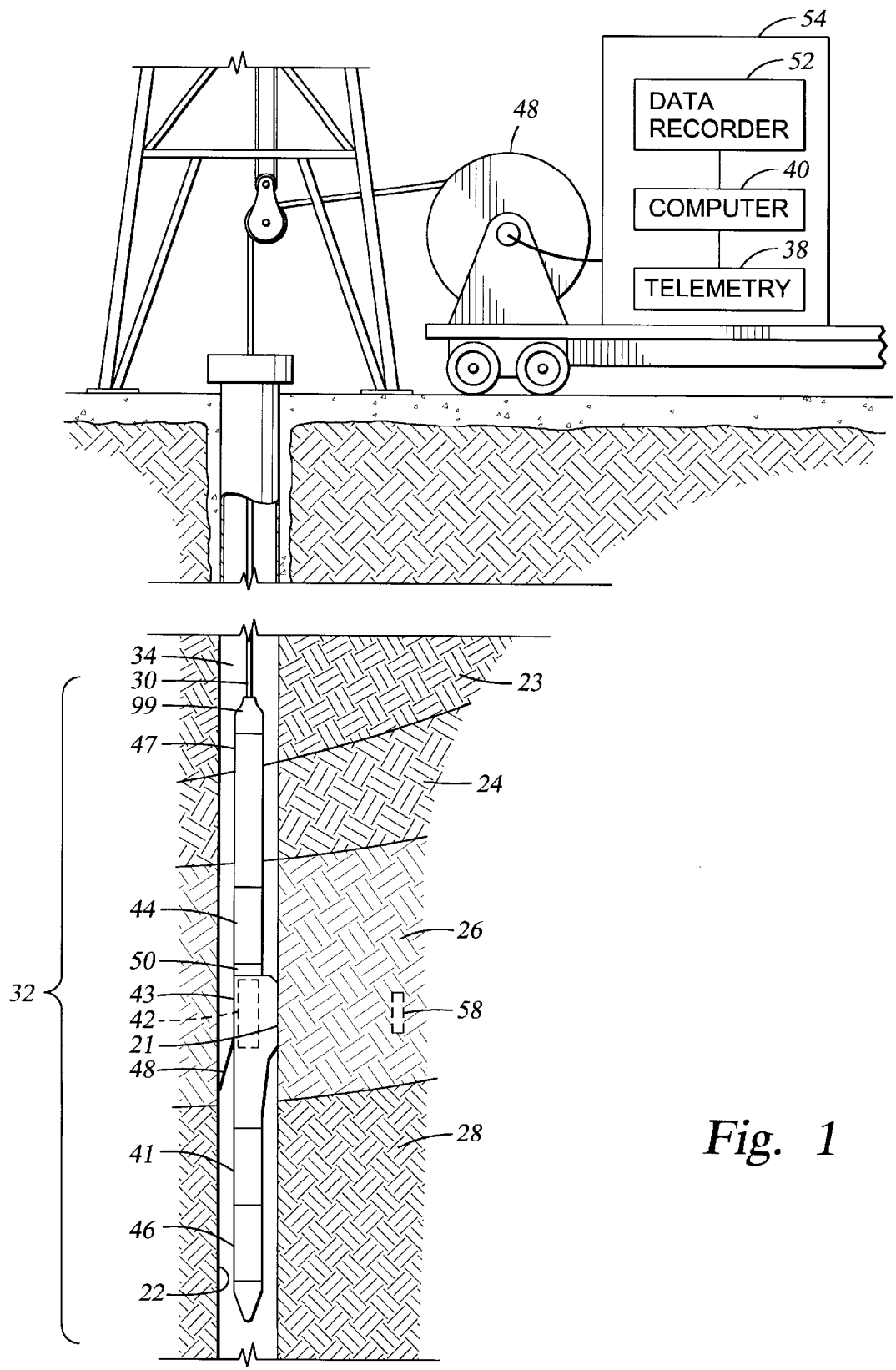
FIG. 1 shows a nuclear magnetic resonance well logging apparatus disposed in a wellbore penetrating earth formations.

FIG. 1 shows a string of logging tools 32 disposed in a wellbore 22 drilled through earth formations 23, 24, 26, 28 for the purpose of making measurements of properties of the earth formations 23, 24, 26, 28. The wellbore 22 in FIG. 1 is typically filled with a fluid 34 known in the art as "drilling mud". A "sensitive volume", shown generally at 58 and having generally the shape of a cylindrical sector, is disposed within one of the earth formations, shown at 26. The sensitive volume 58 is located on one side of the wellbore 22 and is a predetermined portion of the earth formations 26 in which nuclear magnetic resonance ("NMR") measurements are made by the logging instrument, as will be further explained in detail.

A string of logging tools 32, which can include an NMR logging instrument designed according to the invention, is typically lowered into the wellbore 22 by a means of an armored electrical cable 30. The cable 30 can be extended into and withdrawn from the wellbore 22 by means of a winch or drum 48 or similar device known in the art. The tool string 32 can be electrically connected to surface equipment 54 by an insulated electrical conductor (not shown separately in FIG. 1) forming part of the cable 30. The surface equipment 54 can include one part of a telemetry system 38 for communicating control signals and data between the tool string 32 and a computer 40. The computer can also include a data recorder 52 for recording measurements made by the logging apparatus and transmitted to the surface equipment 54 over the cable 30.

An NMR probe 42 according to the invention can be included in the string of logging tools 32. The NMR probe 42 preferably has a face 21 placed in contact with the wellbore wall, and having an appropriate curvature so that only a very small gap generally exists between the face 21 and the wellbore 22 wall. The probe 42 can also have a selectably extensible arm 48, or similar means for urging the probe 42, which can be activated to press the probe 42 in the direction of the wellbore 22 wall, so that the face 21 is firmly pressed against the wellbore 22 wall during measuring operations.

Circuitry for operating the NMR probe 42 can be located within an NMR electronics cartridge 44. The circuitry can be connected to the NMR probe 42 through a connector 50. The NMR probe 42 is typically located within a protective housing 43 which is designed to exclude the drilling mud 34 from the interior of the probe 42. The function of the probe 42 and the circuitry in the cartridge 44 will be further explained.

Other well logging sensors may form part of the tool string 32. As shown in FIG. 1, one of the additional logging sensors, shown at 47, may be located above the NMR electronics cartridge 44. Other logging sensors, such as shown at 41 and 46 may be located below the NMR probe 42. The other sensors 41, 46, 47 can be of types familiar to those skilled in the art and can include, but are not limited to, gamma ray detectors, formation bulk density sensors or neutron porosity detectors. Alternatively, parts of the NMR electronics may be located within electronic cartridges which form part of other logging sensors 41, 46, 47. The locations of, and types of, the other sensors 41, 46, 47 shown in FIG. 1 are a matter of convenience for the system designer and are not to be construed as a limitation on the invention.

Figure 2:
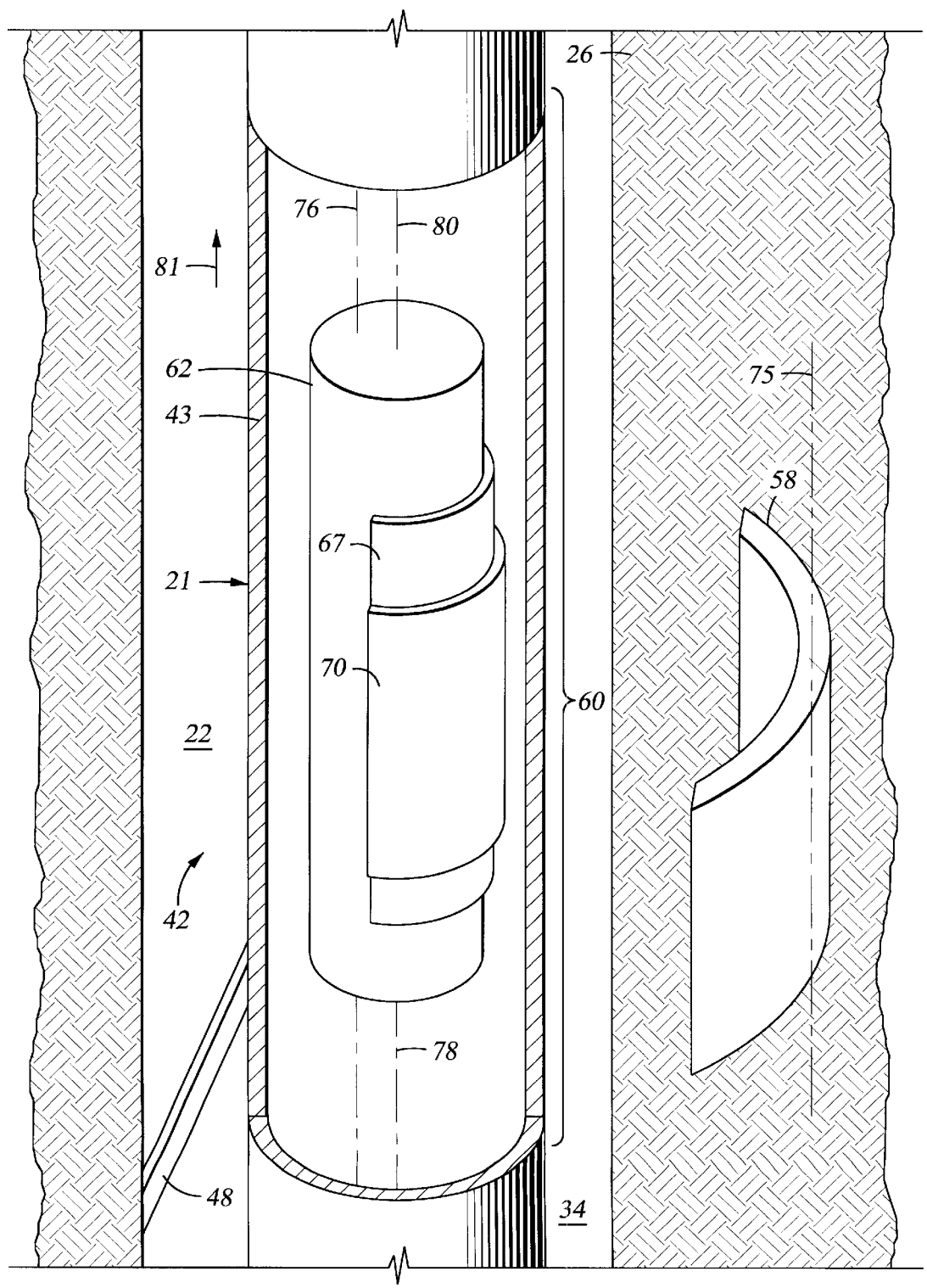
FIG. 2 shows an NMR probe portion of the apparatus of FIG. 1 in more detail.

FIG. 2 shows the NMR probe 42 in more detail. The NMR probe 42 preferably includes a permanent magnet assembly 60. The magnet assembly 60 can include a permanent magnet 62, which is generally elongated along a magnet axis 80 and preferably has a generally circular cross section perpendicular to the magnet's axis 80. The magnet axis 80 is should be substantially parallel to the axis 76 of the wellbore (22 in FIG. 1). Alternatively, a plurality of smaller permanent magnets (not shown separately) may be assembled together to make up the magnet assembly 60. For clarity of the description of the invention, the one or more permanent magnets will be considered together and referred to as the permanent magnet 62, and their common axis 80 will be jointly identified as the "longitudinal axis", as shown at 78.

The magnetization direction of the permanent magnet 62 is preferably parallel to the longitudinal axis 78. The dimensions of the permanent magnet 62 in crosssection along the magnet axis 80 affect the characteristics of the static magnetic field which is induced by the permanent magnet 62 within the sensitive volume 58. The dimensions of the magnet 62 which will provide the desired characteristics in the sensitive volume 58 will be described in more detail later. An important feature of the magnet 62 is that the static magnetic field as it is induced within the sensitive volume 58 is generally in the shape of a cylindrical sector having a "sensitive volume longitudinal axis" 75 substantially parallel to the longitudinal axis 78. The direction of the static magnetic field within the sensitive volume 58 induced by the magnet 62 is substantially parallel to both the sensitive volume longitudinal axis 75 and to the longitudinal axis 78.

Permanent magnet materials from which the permanent magnet 62 should be made are substantially transparent to RF energy at the frequency used for NMR measurement by the probe 42, so that an antenna used to generate a radio frequency magnetic field can be located on the outer surface of the permanent magnet 62, as will be further explained.

One type of material suitable for the magnet 62 is a ferrite magnet material such as that sold under the trade name "Spinalor" and manufactured by Ugimag, 405 Elm St., Valparaiso, Ind. Another suitable ferrite magnet material is sold under the trade name "Permadure" and is manufactured by Philips, 230 Duffy Ave., Nicksville, N.Y. These materials are only presented here as examples of suitable magnet materials and are not meant to limit the magnet materials which may be used in the invention.

The NMR probe 42 also includes a transmitter antenna 67, which can comprise one or more coil windings, as will be further explained in more detail. The transmitter antenna 67 is preferably arranged along the exterior surface of the magnet 62 adjacent to the probe face 21. Radio frequency (RF) alternating current passing through the transmitter antenna generates an RF magnetic field in the earth formation (26 in FIG. 1). The RF magnetic field should have field directions substantially perpendicular to the sensitive volume longitudinal axis 75 where the RF field passes through the sensitive volume 58.

The overall length of the transmitter antenna 67 parallel to the longitudinal axis 78 should be substantially longer than the length of the antenna 67 perpendicular to the longitudinal axis 78, so that the transmitter antenna 67 will function essentially as a two-dimensional magnetic dipole. Such an antenna generates substantially equal RF magnetic field amplitudes at any location within the sensitive volume 58. In addition, the overall length of the transmitter antenna 67 parallel to the longitudinal axis 78 should be substantially shorter along a direction of movement of the NMR probe 42, as denoted by arrow 81, than the overall length of the permanent magnet 62 along the longitudinal axis 78, as will be further explained.

The NMR probe 42, can also include a receiver antenna 70, which can include one or more coil windings, preferably arranged along the exterior surface of the permanent magnet 62 adjacent to the probe face (21 in FIG. 1). Preferably the receiver antenna 70 has an overall length parallel to the longitudinal axis 78 which is less than the overall length of the transmitter antenna 67 in the direction of movement 81. As a consequence, the overall length of the receiver antenna 70 parallel to the longitudinal axis 78 should be substantially shorter in the direction of movement 81 than the length of the permanent magnet 62 along the longitudinal axis 78. A particular property of the receiver antenna 70 arrangement as described herein is that it is substantially orthogonal to, and consequently substantially insensitive to, the direct RF magnetic field generated by the transmitter antenna 67. This insensitivity to the direct RF field enables the receiver coil 70 to provide the logging apparatus with a very short "dead time", while the current flowing through the transmitter antenna 67 is decaying to zero after application of each RF power pulse. An alternative arrangement of the transmitter antenna 67, which will be described later in more detail, may be used to generate a circularly polarized RF magnetic field in the sensitive volume 58 which utilizes only half the RF power as compared to that used for a linearly polarized RF magnetic field. Additionally, as will be further explained, two signals in quadrature may be induced by the nuclear magnetic resonance signals and into a particular embodiment of the receiver antenna 70 and be detected in quadrature with respect to each other. Details of the static magnetic field in the sensitive volume 58 and details of generating the radio frequency magnetic field in the sensitive volume 58 for exciting nuclei of the earth formations using the transmitter antenna 67 and detecting an induced NMR signal using the receiver antenna 70 will be further explained.

The permanent magnet 62, the transmitter antenna 67 and the receiver antenna 70 are preferably housed within an RF transparent protective housing 43. Such housings and additional components (not shown) for excluding the drilling mud under high hydrostatic pressure, are familiar to those skilled in the art.

2. Transmitting and Receiving Antenna Arrangement

Figure 3A:
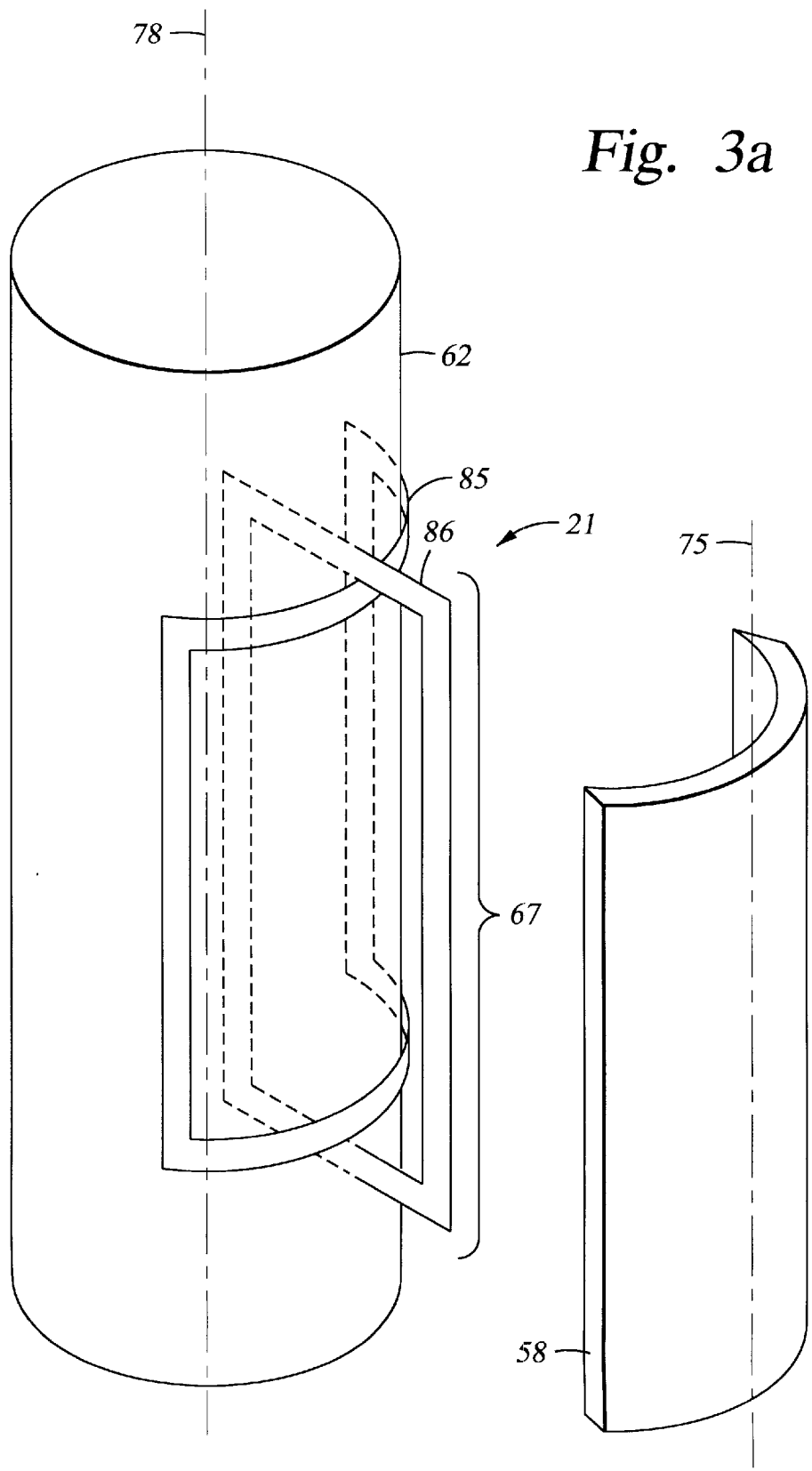
FIG. 3A shows a detailed drawing of a transmitter antenna for generating a circularly polarized RF magnetic field.

FIG. 3A shows an embodiment of the transmitter antenna (67 in FIG. 2) which further improves the performance of the apparatus of the invention. Transmitting an NMR experiment requires a "rotating" or circularly polarized RF magnetic field. One way to transmit such a field is by applying a linearly polarized RF magnetic field, which can be represented as two counter-rotating components. Only one component is useful in the NMR experiment; the second one is redundant. This wastes half of the RF power applied to the antenna (67 in FIG. 2). In well logging applications, the amount of power available is limited since it must be transmitted along the cable (30 in FIG. 1) and, therefore, its conservation is important. Alternatively, the RF power can be traded for signal-to-noise improvement. The transmitter antenna 67 shown in FIG. 3A includes a first transmitter coil 85 and a second transmitter coil 86. Both transmitter coils are preferably arranged along the exterior surface of the permanent magnet 62 adjacent to the probe face (21 in FIG. 1). These coils 85, 86 are substantially identical in form, but each coil is oriented so as to have its sensitive direction 90° rotated respect to the other coil about its longitudinal axis. The longitudinal axis of each coil 85, 86 is parallel to the longitudinal axis 78.

Figure 3B:
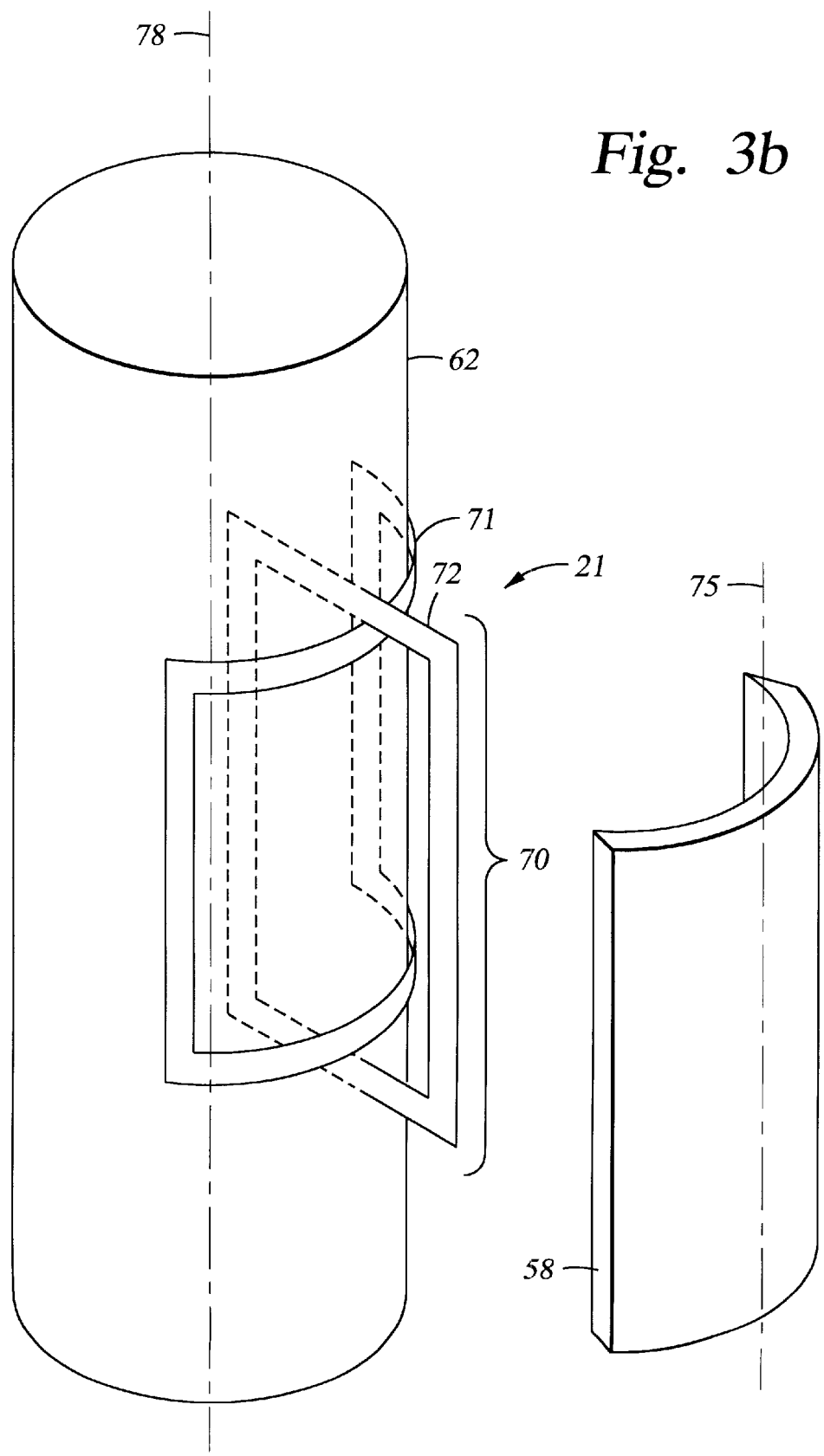
FIG. 3B shows a detailed drawing of a receiving antenna for quadrature two-channel phase-sensitive detection of NMR signals.

FIG. 3B shows an embodiment of the receiver antenna (70 in FIG. 2) which comprises a first receiving coil 71 and a second receiving coil 72. Both receiver coils 71, 72 are preferably arranged along the exterior surface of the permanent magnet 62 adjacent to the probe face (21 in FIG. 1). These coils 71, 72 are substantially identical in form, but each coil is rotated 90° with respect to the other about its longitudinal axis. The longitudinal axis of each receiver coil 71, 71 is substantially parallel to the longitudinal axis 78.

The advantages of having two separate RF coils orthogonal to each other, where both coils may generate an RF magnetic field orthogonal to the static magnetic field within the sensitive volume (58 in FIG. 2), include the fact that separate orthogonal transmitting and receiving coils may be individually optimized. There is also the potential to improve the signal-to-noise ratio by a factor √2 for any particular amount of RF power used to generate the RF magnetic field. This improvement in the signal-to-noise ratio may be achieved by a technique known in the art of NMR measurement as two-channel quadrature phase-sensitive detection. Detailed design and necessary circuitry for orthogonal transmitting and two-channel quadrature phase-sensitive receiving by a phase-splitting network is explained, for example, in C-N Chen et al, *Biomedical Magnetic Resonance Technology*, Adam Hilger, p. 149 (1989).

Figure 4:
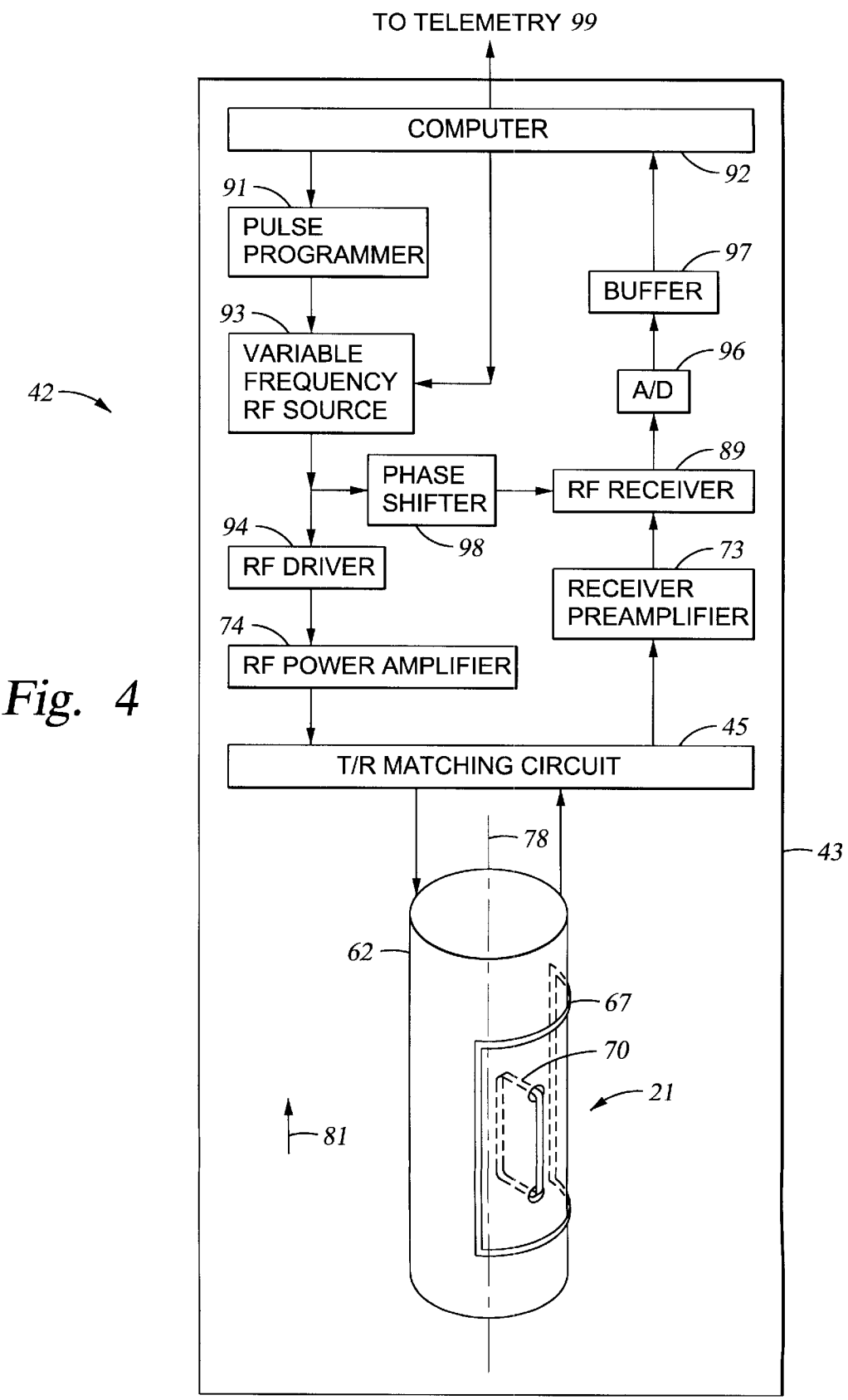
FIG. 4 shows a functional block diagram of the NMR apparatus of the present invention.

Reference is now made to FIG. 4. In addition to saving half of the RF power and/or improving the signal-to-noise ratio, a significant dead time reduction may be achieved by orthogonal transmitting and receiving. Thus, during transmission of the RF magnetic field by conducting RF pulses through the transmitter antenna 67 as shown in FIG. 4, there is substantially zero signal directly induced in the receiver coil 70. As a result, the dead time of the whole receiving system may be reduced significantly with respect to prior art NMR logging instruments having only a single transceiver antenna.

Another aspect of the preferred embodiment of the transmitter antenna 67 and the receiver antenna 70 is their relative sizes with respect to movement along the longitudinal axis 78. As previously explained, the receiver antenna 70 preferably has an overall length parallel to the longitudinal axis 78 less than an overall length of the transceiver antenna 67 along the direction of movement 81 as can be seen in FIG. 4. These antenna dimensions can be included to provide the logging apparatus with the ability to RF-excite nuclei within a region completely polarized by the static magnetic field, and to receive NMR signals from completely RF-excited nuclei even while the logging apparatus is moving along the wellbore (22 in FIG. 1).

3. Functional Block Diagram

FIG. 4 also shows, in general form, the NMR probe 42 and a functional block diagram of the circuitry of the NMR well logging apparatus. A transmitter/receiver (T/R) matching circuit 45 can be disposed within the housing 43. The T/R matching circuit 45 typically includes a series of resonance capacitors (not shown separately), a transmitter/receiver switch (not shown separately) and both "to-transmitter" and "to-receiver" matching circuitry. The T/R matching circuit 45 can be coupled both to a radio frequency (RF) power amplifier 74 and to a receiver preamplifier 73. While shown as located inside the housing 43, the T/R matching circuit 45, the RF power amplifier 74 and the receiver preamplifier 73 alternatively may be located outside the housing 43 within the NMR electronics cartridge (44 in FIG. 1). The locations of the T/R matching circuit 45, the RF power amplifier 74 and the receiver preamplifier 73 are not to be construed as a limitation on the invention.

Part of the control circuitry for the NMR logging apparatus includes a downhole computer 92, which among other functions provides control signals to a pulse programmer 91. The computer 92 and the pulse programmer 91 may also be located within the NMR electronics cartridge 44. The pulse programmer 91 controls the timing and operation of the variable frequency RF signal source 93. The RF driver 94 receives an input from the variable frequency RF source 93 and provides an output to the RF power amplifier 74. The RF power amplifier 74 provides a high power signal to drive the transmitter antenna 67 for generating an RF magnetic field in the sensitive volume (58 in FIG. 1). The RF power amplifier 74 can be electrically connected (typically by the switch in the T/R matching circuit 45) to the transmitting antenna 67 during transmission of RF power pulses.

For transmitting a circularly polarized RF magnetic field the T/R matching circuit 45 can include a two-way splitter (not shown separately) to split the RF power from amplifier 74 into two equal separate channels. One channel can be directly connected to the first transmitting coil (85 in FIG. 3A). The second channel can be connected to the second transmitting coil (86 in FIG. 3A) through a power-capable 90° phase shifter (not shown separately) which can be located in the T/R matching circuit 45.

During reception of the induced NMR signal, the receiver antenna 70 can be electrically connected to the receiver preamplifier 73 by means of the switch (not shown)in the T/R matching circuit 45. The output of the RF receiver preamplifier 73 is provided to an RF receiver 89. The RF receiver 89 also receives a phase reference input from a phase shifter 98. The phase shifter 98 receives a primary phase reference input from the variable frequency RF source 93. The RF receiver 89, as previously explained, may include the capability for phase-sensitive quadrature detection. The RF receiver 89 provides an output to an A/D converter 96. The A/D converter 96 output can be stored in a buffer 97 until required for use by the down-hole computer 92. Alternatively, the buffer 97 contents can be conducted directly to a downhole part of the telemetry unit 99 for transmission to the surface equipment (54 in FIG. 1).

For quadrature two-channel phase-sensitive detection the receiver antenna (70 in FIG. 2) may be constructed in accordance with FIG. 3B and can include the first receiving coil (71 in FIG. 3B) and the second receiving coil (72 in FIG. 3B). These coils, as previously explained, are substantially identical in form, but are offset 90° with respect each other about their longitudinal axes. NMR events induce a first signal into the first receiving coil (71 in FIG. 3B) and induce a second signal, which has a 90° phase difference with respect to the first signal, into the second receiving coil (72 in FIG. 2). Coils 71 and 72 can be electrically connected to the receiver preamplifier 73 by means of the switch (not shown) in the T/R matching circuit 45. As is understood by those skilled in the art of NMR systems, for quadrature two-channel phase-sensitive detection two substantially equal and independent channels should be provided in the T/R matching circuit 45, the receiver preamplifier 73, the RF receiver 89, the A/D converter 96 and the buffer 97.

The downhole computer 92 typically preprocesses the data from the buffer 97 and transfers the preprocessed data to the downhole portion of the telemetry system, shown generally at 99. The downhole portion of the telemetry system 99 can transmit the preprocessed data to the telemetry unit (38 in FIG. 1) in the surface equipment (54 in FIG. 1). The telemetry unit 38 can transfer the data to the surface computer (40 in FIG. 1) for calculating and presenting desired well logging output data for further use and analysis.

All of the elements described herein and shown in FIG. 4, except the transmitter antenna 67, the magnet assembly 60 and the receiver antenna 70, as a matter of convenience for the system designer may be disposed within the housing 43 or in the NMR electronics cartridge (44 in FIG. 1). These same elements may alternatively be located at the earth's surface, for example in the surface equipment 54 using the cable (30 in FIG. 1) for transmission of electrical power and signals to the transmitter antenna 67 and the receiver antenna 70. The location of these elements should therefore not be construed as a limitation on the invention.

4. Static and RF Magnetic Field Geometry

Figure 5:
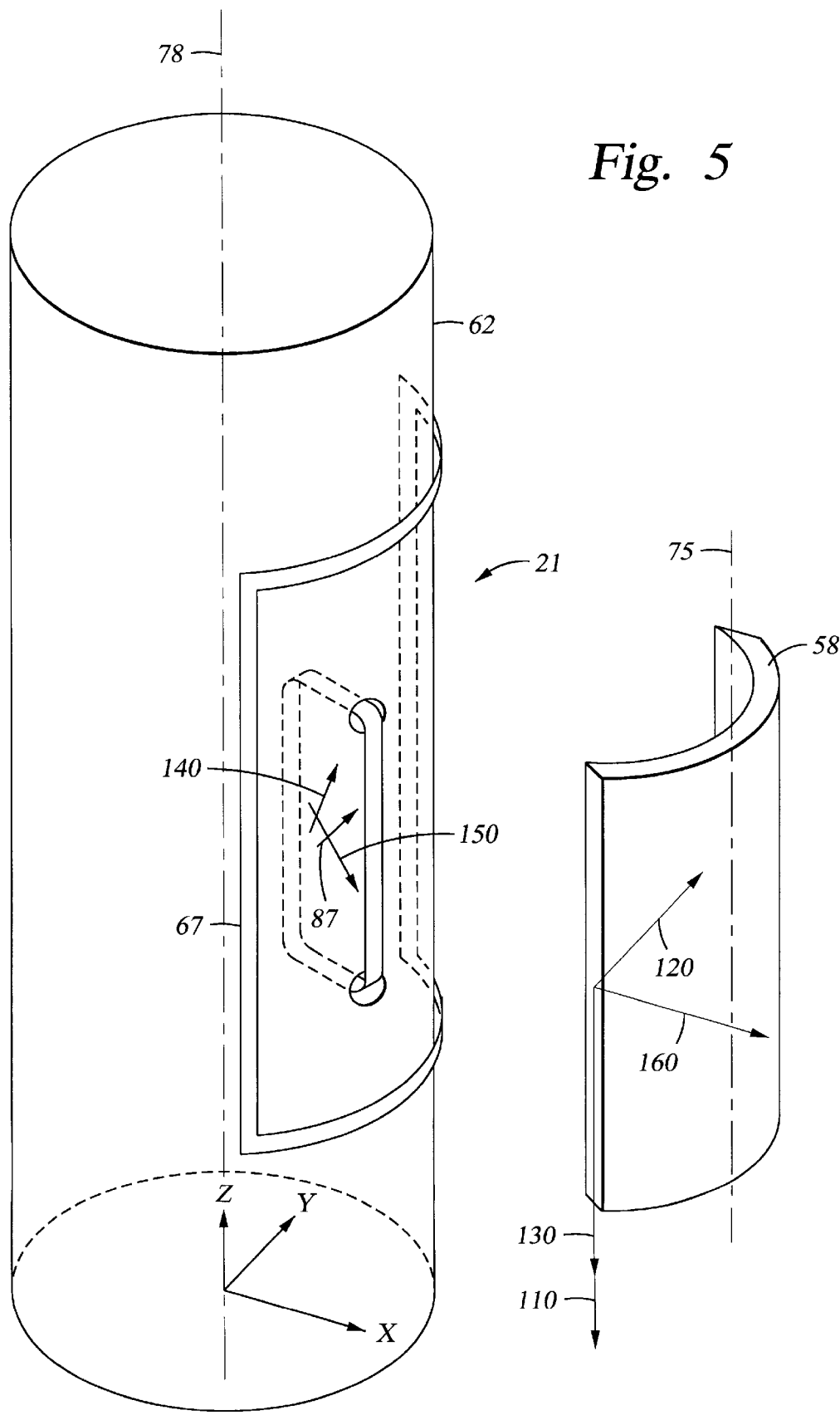
FIG. 5 shows a graphic representation of a static magnetic field and a radio frequency (RF) magnetic field.

FIG. 5 shows graphically the geometry of the static magnetic field and the RF magnetic field induced by the NMR well logging apparatus of the invention. The magnet 62, as previously explained, preferably has a magnetization direction substantially parallel to the longitudinal axis 78. The direction of the static magnetic field within the sensitive volume 58, as shown by arrows 110, is also substantially parallel to the longitudinal axis 78. Nuclear magnetic moments in the earth formation located within the sensitive volume 58 become substantially aligned in the direction of the static magnetic field, resulting in a bulk nuclear magnetization in a direction denoted by arrows 130. In the preferred embodiment of the invention, the direction of an equivalent linearly polarized RF magnetic field, as generated by the transmitter antenna 67 and denoted by arrows 120, would be substantially perpendicular to the static magnetic field at any point within the sensitive volume 58. Such a magnetic field arrangement is conventional for NMR experiments.

The static magnetic field has an amplitude gradient within the sensitive volume 58 which is directed substantially radially inwardly towards the longitudinal axis 78. As a result of the structure of the static magnetic field there is generally only one substantially cylindrically-shaped volume external to the permanent magnet 62 which has a single static magnetic field amplitude (ignoring the end effects of the magnet 62). This structure of the static magnetic field provides that stray resonance signals from diverse materials such as the drilling mud (34 in FIG. 1), which originate outside of the sensitive volume 58 do not substantially affect the NMR measurements if appropriate RF magnetic field frequencies are selected.

Undesired static magnetic field end effects may be substantially eliminated by making the transmitting antenna 67 somewhat shorter along the longitudinal axis 78 than the magnet 62, so as not to excite materials at the extreme longitudinal ends of the static magnetic field. Additionally, since the transmitting antenna 67 is offset to one side of the longitudinal axis 78 in the direction of the face 21, the sensitive volume 58 will subtend only about a 60° angular sector around the longitudinal axis 78 wherein the RF magnetic field strength is substantially uniform.

When RF power pulses are conducted through the transmitter antenna 67, the antenna 67 generates an RF equivalent magnetic dipole 87 located at the transmitter antenna 67 center and directed perpendicularly to the longitudinal axis 78. This equivalent magnetic dipole 87 generates an equivalent linearly polarized RF magnetic field 120 of substantially equal amplitude within the sensitive volume 58. Since the RF magnetic field direction is perpendicular to the sensitive volume longitudinal axis 75, the bulk nuclear magnetization, denoted in FIG. 5 by arrows 130, at any point in the sensitive volume 58 rotates in planes parallel to the sensitive volume longitudinal axis 75. The free precession of the nuclear magnetic moments, however, is around the static magnetic field direction at any point within the sensitive volume 58, and the free precession is always in planes perpendicular to the sensitive volume longitudinal axis 75. The free precession will, therefore, induce a first RF signal in the receiver antenna 70. An induced magnetic moment in the receiver coil 70 is shown in FIG. 5 by arrow 140.

For generation of a circularly polarized RF magnetic field, as previously explained, the transmitter antenna 67 can include a first transmitter coil (85 in FIG. 3A) and a second transmitter coil (86 in FIG. 3A) (not shown separately in FIG. 5). When RF power pulses separated in phase by 90° are conducted separately through these two orthogonal transmitting coils, then two orthogonal, substantially equal amplitude, linearly polarized RF magnetic fields, denoted in FIG. 5 by arrows 120 and 160, are generated within the sensitive volume 58. Since the orthogonal transmitting coils are fed by RF currents 90° out of phase with each other, the resulting RF magnetic field within the sensitive volume 58 will be circularly polarized or "rotating" in planes perpendicular to the sensitive volume longitudinal axis 75.

Those skilled in the art of nuclear magnetic resonance measurements will readily comprehend that the free precession of the bulk nuclear magnetization about the static magnetic field will also induce a second RF signal in the transmitter coil 67. An induced magnetic moment in the receiver coil 70 is shown in FIG. 5 as an arrow 150. The signal induced in the transmitter coil 67 will have a 90° phase shift with respect to the signal which is induced in the receiver coil 70.

5. Design Parameters for the Preferred Embodiment

In the preferred embodiment of the invention, the signal-to-noise ratio for the NMR measuring process is optimized, while keeping the vertical resolution of the instrument to an acceptable value and while keeping the geometry of the sensitive volume 58 constrained to avoid exciting nuclei in spurious locations such as the wellbore (22 in FIG. 1). The following discussion is intended to explain how certain principal design parameters affect the signal-to-noise ratio so that the selection of the design parameters can be explained.

The principal design parameters typically include: the overall geometry of the permanent magnet (62 in FIG. 2) and the transmitter antenna (67 in FIG. 2); the power of radio frequency pulses used to energize the transmitter antenna 67; and the quality factor, Q, of the receiver antenna 70. For simplicity, this discussion assumes that the transmitter antenna 67 and the receiver antenna 70 have the same length along the longitudinal axis 78, and that the transmitter antenna 67 is rotated 90° with respect to the receiver antenna 70 around its own longitudinal axis, which is parallel to the longitudinal axis 78.

The magnitude of an NMR signal, S, induced in the receiver antenna 70 can be described by using the principle of reciprocity, as shown in the following expression:

$$S = \omega m \, A_{sv}(B_{1r}/I_1) l \tag{1}$$

where m and $A_{sv}$, respectively, represent the nuclear magnetization amplitude and the cross-sectional area of the sensitive volume (58 in FIG. 1). $B_{1r}$, represents the magnetic field produced by a hypothetical unit current, $I_1$, flowing in the receiver antenna 70, the oscillating frequency of the current is represented by $\omega$, and l represents the effective lengths of both the transmitter antenna 67 and the receiver antenna 70. m and $B_{1r}$ are assumed to be substantially homogeneous within the sensitive volume 58. By substituting $m = \chi B_0/\mu_0$, where $\chi$ represents the nuclear magnetic susceptibility of hydrogen nuclei within the sensitive volume 58, $\omega = \gamma B_0$, where $B_0$ represents the static magnetic field generated by the permanent magnet (62 in FIG. 2), the following expression for S can be derived:

$$S = (\gamma \chi / \mu_0) \, B_0^2 (B_{1r}/I_1) \, A_{sv} \, l \tag{2}$$

The magnitude of the NMR signal thus acquired is directly proportional to the physical volume of the sensitive volume 58 within the earth formation (26 in FIG. 1). The geometry of the sensitive volume 58 is determined by where nuclear magnetic resonance conditions exist. In pulsed NMR, the resonance conditions typically exist where the deviation of the static magnetic field magnitude, $B_0(R)$, from its average value in the sensitive volume, $B_0(R_{sv})$, (corresponding to the central frequency of the current energizing the transmitter antenna 67 ($B_0(R) = \omega/\gamma$)) is no greater then half the magnitude of the RF magnetic field, $B_{1t}$, induced by passing RF current through the transmitter antenna 67. An expression for this condition is shown in equation (3):

$$B_0(R) - B_0(R_{sv}) \leq B_{1t}/2 \tag{3}$$

The static magnetic field amplitude, $B_0(R)$, at the radius of the sensitive volume, $R_{sv}$, may also be described in the form of a Taylor expansion as:

$$B_0(R) = B_0(R_{sv}) - (\partial B_0/\partial R)(R - R_{sv}) \tag{4}$$

where $(\partial B_0/\partial R)$ represents the static magnetic field amplitude gradient at radius $R = R_{sv}$. From equation (3):

$$B_0(R_0) - B_0(R_i) \leq B_{1t} \tag{5}$$

where $R_0$ and $R_i$ represent, respectively, the outer and inner radii of the sensitive volume 58. As a practical matter $R_0 - R_i << R_{sv}$, therefore:

$$A_{sv} = 2 \pi \alpha R_{sv} \, B_{1t}/(\partial B_0/\partial R) \tag{6}$$

where $\alpha$ represents the angle subtended by the "sector" (the sensitive volume 58) which is excited by the RF magnetic field. Substitution of equations (6) and (5) into equation (2) yields the following expression:

$$S = [2 \, \pi(\gamma \chi/\mu_0) \, R_{sv} \, B_{1t} \, B_{1r}/I_1][\alpha l \, B_0^2/(\partial B_0/\partial R)] \tag{7}$$

As is understood by those skilled in the art, the root-mean-square (RMS) thermal noise can be described by the expression:

$$N_{rms} = (4k \, T \, \Delta f \, r)^{1/2} \tag{8}$$

where $\Delta f$ represents the receiver bandwidth. The receiver bandwidth is typically about $\gamma B_1/2 \, \pi$ for a matched receiver; k represents Boltzmann's constant; and T represents the absolute temperature. Then substituting for equations (7) and (8) yields the following expression for signal-to-noise ratio (S/N):

$$S/N = 4 \, \pi R_{sv} \, [(\gamma \chi/\mu_0) \, (k \, T \, \Delta f \, r)^{-1/2} B_{1t} \, B_{1r}/I_1] \times [\alpha l \, B_0^2/(\partial B_0/\partial R)] \tag{9}$$

The first bracketed expression in equation (9), for a given proton spin density and absolute temperature, depends only on the transmitter antenna 67 and the receiver antenna 70 parameters.

The second bracketed expression in equation (9) describes parameters used in the design of the permanent magnet (62 in FIG. 2), as will be further explained. It should be noted that the second bracketed expression includes terms related to the subtended angle of the sensitive volume sector, $\alpha$, the aperture of the antennas, l, and the amplitude gradient of the static magnetic field, $\partial B_0/\partial R$. As suggested by equation (9), the signal-to-noise ratio ("SNR")could be improved by increasing the subtended angle of the sensitive volume sector, but increasing this angle would create an unacceptably high likelihood of having some of the NMR signal originate in the wellbore (22 in FIG. 1) or in mudcake which may be deposited on the wellbore wall. The SNR could also be improved by increasing the length of the magnet 62 and correspondingly the aperture of the transmitting and receiving antennas, but to do so would compromise the vertical resolution of the logging instrument. Similarly, the static field amplitude gradient within the sensitive volume must be limited to avoid undesirable effects on the NMR measurement. The invention seeks to optimize the overall SNR of a side-looking well logging instrument within the constraints of vertical resolution and depth of investigation which are likely to be commercially accepted.

6. Characteristics of the Static Magnetic Field

Figure 6A:
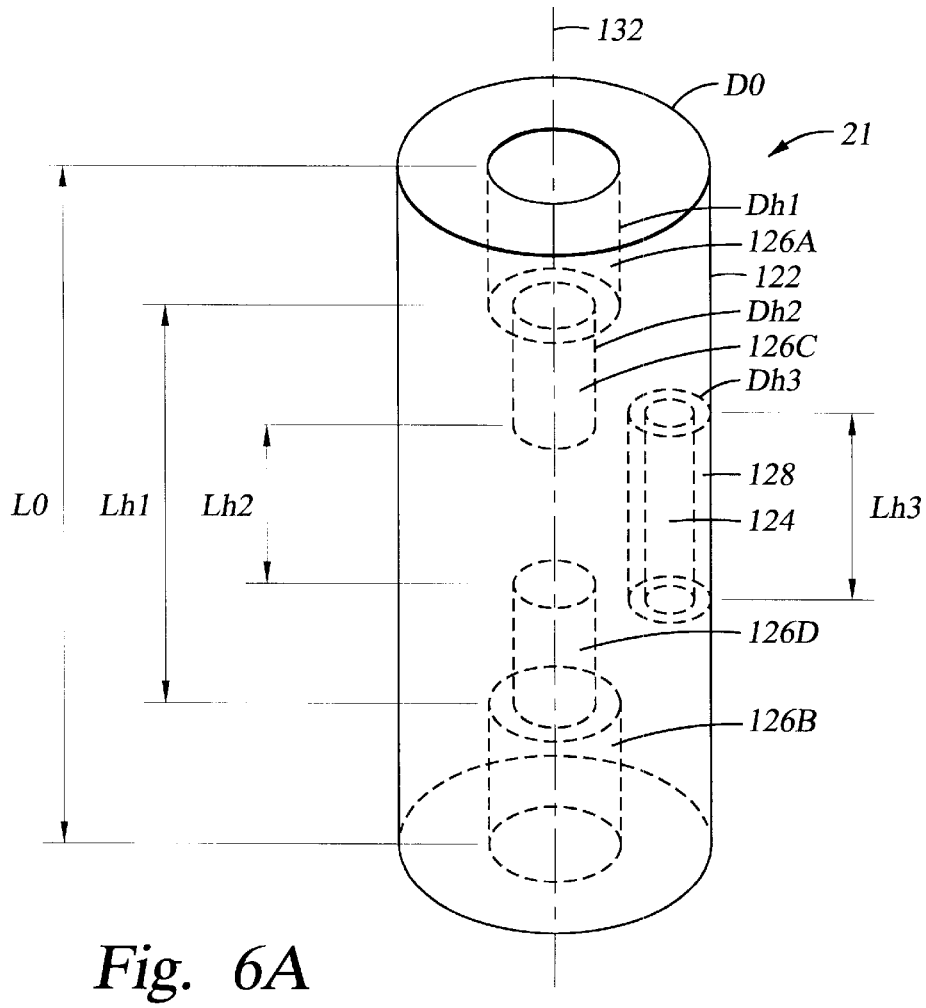
FIG. 6 shows a detailed drawing of a magnet for the invention.
Figure 6B:
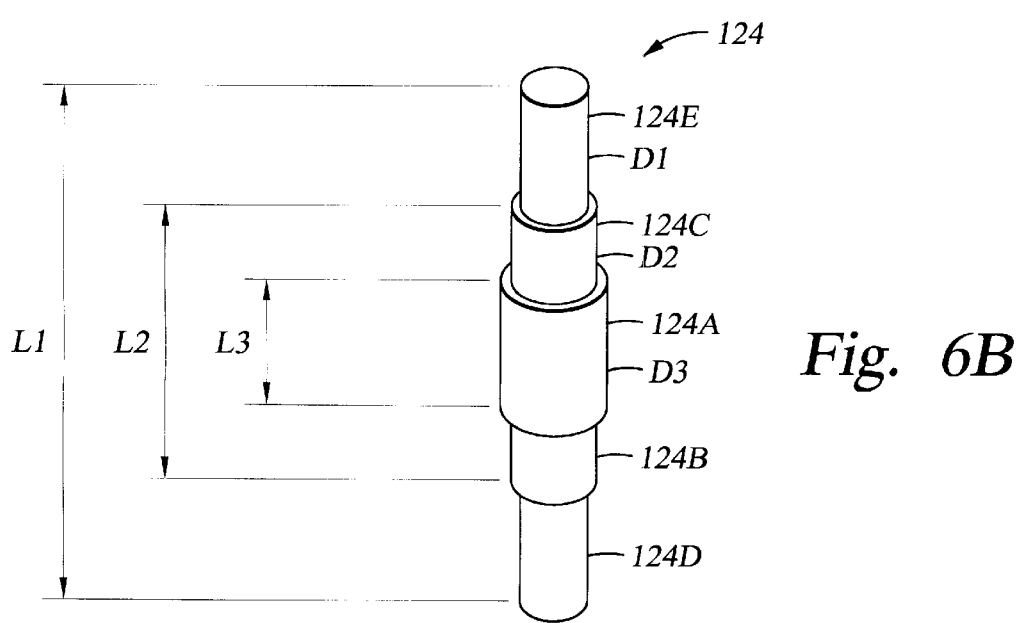

Reference is now made to FIG. 6 which shows the magnet assembly (also shown as 60 in FIG. 2) of the preferred embodiment in more detail. The magnet (62 in FIG. 2) can include a first permanent magnet cylinder 122 having an outside diameter, D0, and a length, L0. The first magnet cylinder 122 can have two substantially identical holes formed coaxially with a first magnet longitudinal axis 132 of the cylinder 122, these holes being located at the top and the bottom of the magnet cylinder 122. As shown in FIG. 6, each of the two holes can have two cylindrical sections of different diameter, a first top hole section 126A and a first bottom hole section 126B each having diameter Dh1; and a second top hole section 126C and a second bottom hole section 126D each having diameter Dh2. The first top hole section 126A and the first bottom hole section 126B are separated by distance Lh1, and the second top hole section 126C and the second bottom hole section 126D are separated by distance Lh2 as shown in FIG. 6.

The first permanent magnet cylinder 122 can have a cylindrical recess 128. The recess 128 should have its geometrical center located substantially in the center plane perpendicular to the axis 132 of the first magnet cylinder 122, and offset to one side of the longitudinal axis 132 adjacent to the probe face 21. The recess 128 can have a diameter of Dh3 and a length of Lh3. A second permanent magnet cylinder 124 can be substantially centered within the recess 128. As shown in FIG. 6, the second permanent magnet cylinder 124 can be made from five individual sections. These include a center section 124A having an outside diameter of D3 and length of L3; a substantially identical top middle section 124C and bottom middle section 124B having outside diameters of D2 and lengths of (L2–L3)/2; and a substantially identical top end section 124E and bottom end section 124D having outside diameters of D1 and lengths of (L1–L2)/2. The top middle section 124C and the bottom middle section 124B are adjacent to the center section 124A at the top and at the bottom of it, respectively. The top end section 124E is adjacent to the top of the top middle section 124C and the bottom end section 124D is adjacent to the bottom of the bottom middle section 124B. The first permanent magnet cylinder 122 and the second permanent magnet cylinder 124 are magnetized uniformly, parallel to the longitudinal axis 78, and in opposite directions to each other.

The specific geometry and arrangements of the first permanent magnet cylinder 122 and the second permanent magnet cylinder 124 shown in FIG. 6 are a matter of convenience for the system designer and are not to be construed as absolute limitations on the invention. The geometry selected for the permanent magnet cylinders is related to three basic characteristics of the static magnetic field which are to be optimized. The first of these characteristics is the static magnetic field magnitude, the second is the static magnetic field homogeneity within the sensitive volume, and the third characteristic is the angle, α, with respect to the longitudinal axis 78, subtended by the sector forming the sensitive volume 58.

As will be further explained, the static magnetic field amplitude gradient in the direction of motion of the logging instrument should be inversely related to the speed of motion of the instrument. For a logging speed of about 10 feet per minute, the longitudinal gradient should be less than about 0.2 Gauss/cm. For expected speeds of radial motion of the logging instrument the gradient in the transverse direction should be less than about 2 Gauss/cm. It should be specifically emphasized that the proposed magnet assembly could theoretically produce a larger homogeneous region in the sensitive volume 58 by having a substantially zero static magnetic field amplitude gradient within the sensitive region 58. However, as has also been previously explained, using a static magnetic field having zero amplitude gradient can result in significant instabilities of the homogeneous volume and its associated static magnetic field magnitude, because of changes in temperature and pressure as well as the relative orientation of the earth's magnetic field with respect to the logging instrument. The static magnetic field strength in the sensitive volume 58 was selected to be about 9.4 mT (94 Gauss) as a compromise between signal-to-noise ratio, vertical resolution of the logging instrument and the overall external diameter of the logging instrument. The azimuthal selectivity was selected to be about 60° which represents an overlay of two annular cylinders having different radii. One cylinder is located between cylindrical surfaces having the static magnetic field magnitude of $B_0-B_1/2$ and $B_0+B_1/2$, the second cylinder has a radio frequency magnetic field strength of about $B_1$.

To keep the length of the magnet 62 as short as is practical and also to ensure a steady state nuclear magnetization measurement even while the NMR probe 42 is moving through the wellbore (22 in FIG. 1), it is important to provide a homogeneous static field amplitude length exceeding the antenna 67 aperture length, l, as previously explained.

Figure 7A:
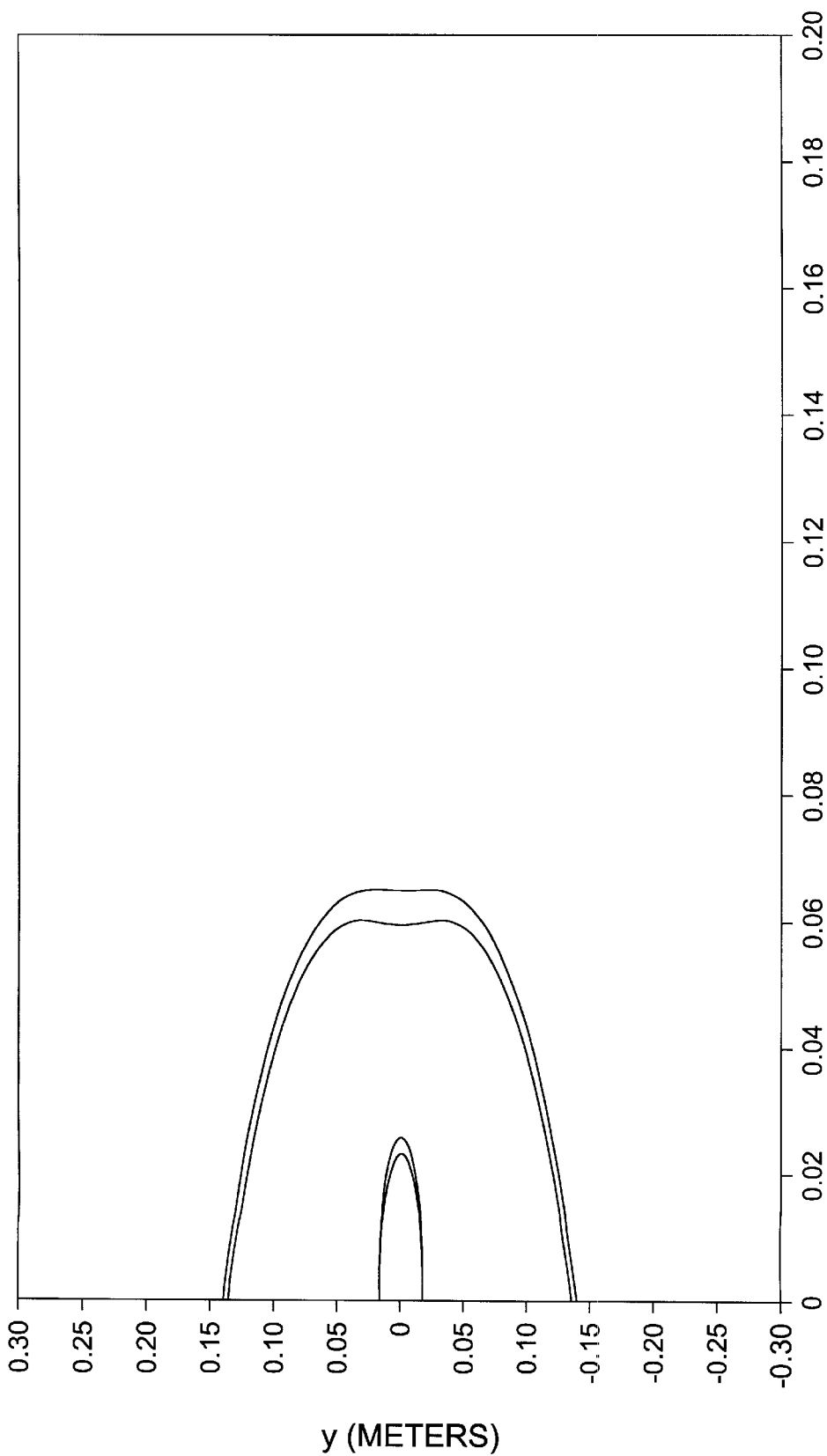
FIG. 7A shows a graph of the static magnetic field in the X-Y plane as induced by the magnet of FIG. 6 in a sensitive volume in the earth formations surrounding the logging instrument.
Figure 7B:
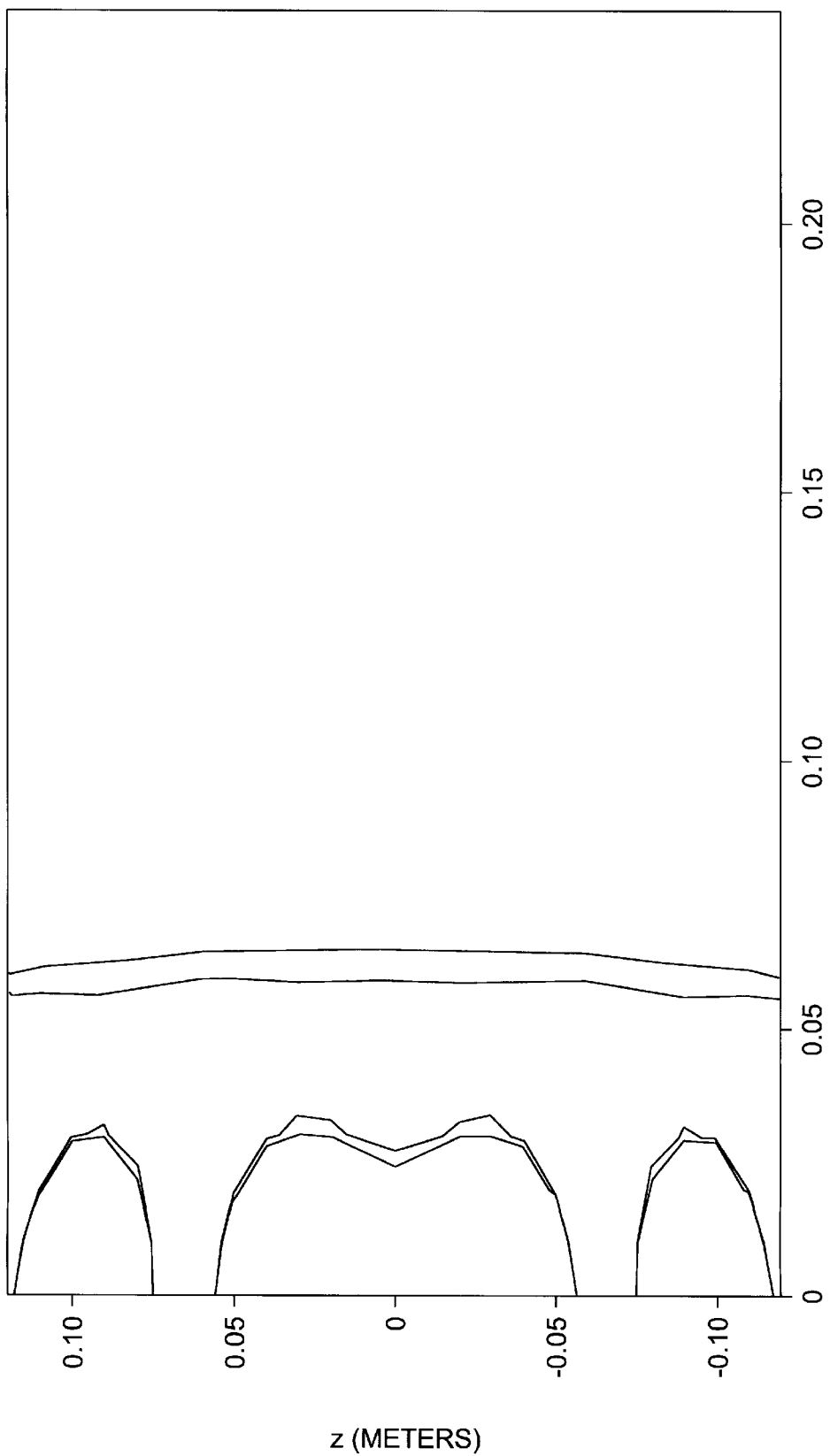
FIG. 7B shows a graph of the static magnetic field in the X-Z plane induced by the magnet of FIG. 6 in the sensitive volume.

It follows from equation (9) that for any given a radius $R_{sv}$ of the sensitive volume, vertical resolution and penetration depth requirements, the ratio $\alpha l B_0^2/(\partial B_0/\partial R)$ should be maximized to provide maximum signal-to-noise ratio. In the preferred configuration the first permanent magnet cylinder (122 in FIG. 6) and the second permanent magnet cylinder (124 in FIG. 6) are magnetized in opposite directions parallel to the longitudinal axis 78. FIG. 7A shows a graphic representation of the static magnetic field 110 which has a field strength of 9.4 mT at the center of the sensitive volume 58. The two lines in FIG. 7A are contour plots for static magnetic field amplitudes of 9.3 mT and 9.5 mT, which determine the shape of the sensitive volume 58 in the X-Y plane (as shown in FIG. 5). FIG. 7B shows a contour plot of the static magnetic field amplitude in the X-Z plane.

Figure 8:
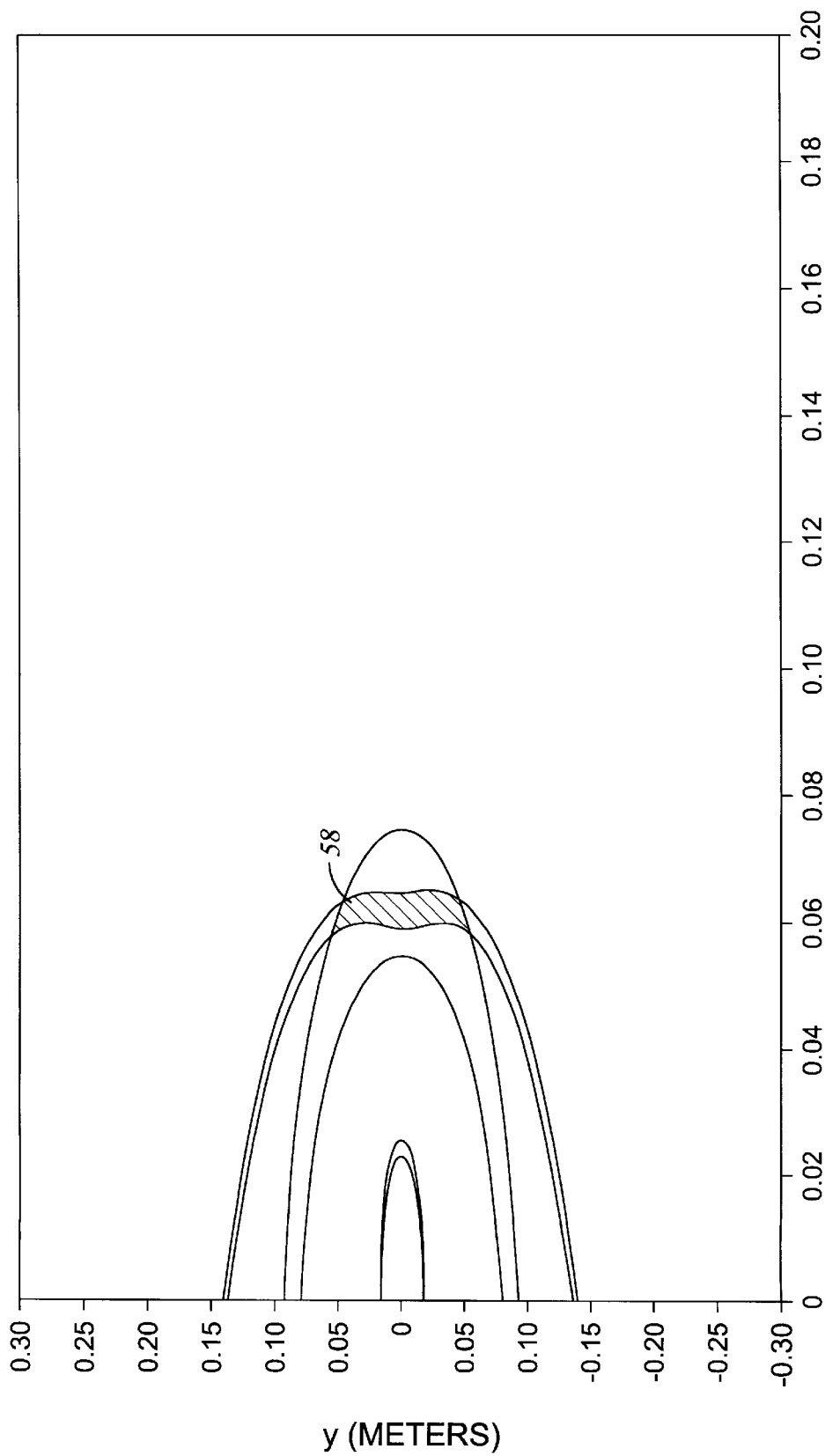
FIG. 8 shows a graph of the sensitive volume as a cross-plot of the static magnetic field induced by the magnet of FIG. 6 and the RF magnetic field.

The selected static magnetic field strength of 9.4 mT corresponds to an RF magnetic field frequency of 0.4 MHz. The sensitive volume 58 is determined by the overlap of the two areas: one is defined according to equation (5) (shown in FIG. 8); and the other represents the region of appropriate RF magnetic field. Overlap of the two regions is shown in FIG. 8. According to FIG. 8 the subtended angle α of the sensitive volume 58 can be estimated to be about 60°. The subtended angle should be as great as possible to maximize the area of the sensitive volume 58, and as a result maximize the SNR, but this maximization must be consistent with limiting the lateral extent of the sensitive volume 58 to avoid its contacting any portion of the wellbore (22 in FIG. 1) or any portion of "mudcake" which may become deposited on the wellbore wall in permeable earth formations.

FIG. 6 shows the geometry of the preferred shape of the magnet 62. The dimensions shown for the magnet in FIG. 6 are preferably as follows: D0=12 cm; Dh1=5.6 cm; Dh2=4 cm; Dh3=2.6 cm; L0=80 cm; Lh1=32 cm ; Lh2=13.5 cm; Lh3=40 cm; D1=1.4 cm; D2=2.1 m; D3=2.6 cm; L1=40 cm; L2=19 cm; L3=7.5 cm. The magnet 62 presented in FIG. 6 is particularly suitable for a 20 cm length for the transmitter antenna 67 and a 7 cm distance between the sensitive volume (58 in FIG. 2) and the face (21 in FIG. 2). These parameters are a matter of convenience for the system designer and are not to be construed as a limitation on the invention. Other dimensions of the magnet 62 can be selected if the logging instrument has different specifications for vertical resolution and radial depth of penetration into the earth formations.

The permanent magnet 62 can be formed from ferrite permanent magnet material, as previously explained. These materials have remanence magnetization between about 0.38 T and 0.42 T. Another magnet material can be bonded rare-earth earth Samarium Cobalt permanent magnet having remanence magnetization of about 0.7 T and a particle size of a rare-earth Samarium Cobalt magnet material powders of generally less than about 0.1 mm. The choice of maximum particle size of 0.1 mm is determined by the requirement for the permanent magnet 62 to be radio frequency transparent at an RF magnetic field frequency of about 0.4 MHz. The field distributions shown in FIG. 7A and FIG. 7B are calculated for a magnet material having remanence magnetization of 0.7 T.

Figure 9:
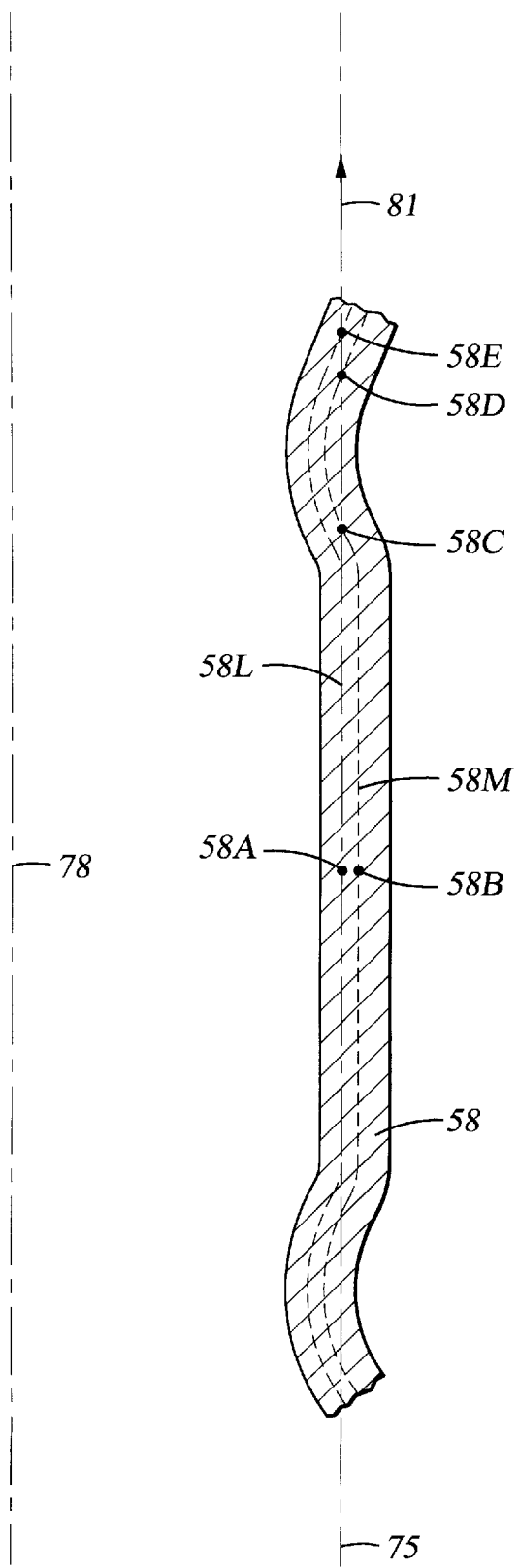
FIG. 9 shows a detailed graph of the static magnetic field induced by the magnet of FIG. 6 within the sensitive volume.

As explained earlier, another parameter affecting the design of the permanent magnet 62 is the degree of the static field homogeneity in the direction of the wellbore axis (76 in FIG. 2). The static magnetic field in the sensitive volume 58 has substantially equal magnitude in sense of NMR excitation. As was explained earlier (see equation (3)), within the sensitive volume 58 the static magnetic field amplitude should vary only in a narrow range: from $B_0-B_1/2$ to $B_0+B_1/2$. It is of great importance how fast is the spatial variation of this field amplitude along a direction of motion of the logging instrument. The rate of this variation is directly related to the static magnetic field amplitude gradient in the direction of motion. The static magnetic field amplitude gradient distribution inside the sensitive volume 58 is explained schematically in FIG. 9. Two lines 58L and 58M represent lines of equal amplitude of the static magnetic field, with a first magnitude and a second magnitude, respectively, which are in the range from $B_0-B_1/2$ to $B_0+B_1/2$. Static magnetic field amplitude gradients at a location 58A and a location 58D in FIG. 9 are inversely proportional to a distance between two points along the direction of movement 81 parallel to the wellbore axis 78, one point is on line 58L and the other point is on line 58M. For example, the amplitude gradient component in the direction of motion 81 at location 58A in the central part of the sensitive volume 58 is inversely proportional to the distance between points 58A and 58C. The gradient component in the direction of motion 81 at location 58D (in the top end of the sensitive volume 58) is inversely proportional to the distance between points 58E and 58D. It should be apparent from FIG. 9 that the amplitude gradient in the central part of the sensitive volume 58 is much smaller than the gradient at the ends of the sensitive volume 58. The amplitude gradient component in a direction of motion perpendicular to the longitudinal axis 78 at location 58A in the center part of the sensitive volume 58 is inversely proportional to the distance between points 58B and 58A. The strongest component of the amplitude gradient is in the radial direction.

The following discussion is to explain a limitation on the static magnetic field amplitude gradient in the direction of motion 81. The sensitive volume 58 is determined by the RF magnetic field amplitude. To obtain undistorted NMR signals, any point within the sensitive volume should not leave the sensitive volume during the time span of a measurement sequence (a full CPMG echo train). If tool motion is such that any point may leave the sensitive volume during a measurement sequence, subsequent 180° rephasing pulses in a Carr-Purcell ("CPMG") echo train may be applied to parts of the earth formation which had not previously been transversely polarized by the initial 90° pulse. The distance, As, along a direction of motion from a point, N, inside the sensitive volume 58 to the boundary of the sensitive volume 58 can be estimated by the expression:

$$\Delta s(N) = [B_0(n) - B_0(B)]/G \qquad (10)$$

where $B_0(N)$ represents the static magnetic field amplitude at point N inside the sensitive volume 58, $B_0(B)$ represents the static magnetic field amplitude at the boundary of the sensitive volume 58 and G represents the static magnetic field gradient in the direction of motion. The total movement, or displacement during a time interval, t, of the well logging instrument should be less than $\Delta S(N)$. More specifically:

$$v \times t < \Delta s(N) \qquad (11)$$

where v represents the speed of motion of the well logging instrument. The total displacement of the instrument should not represent a substantial portion of the total volume. The inequality which should thus be satisfied can be written as:

$$[B_0(N) - B_0(B)] << B_1 \qquad (12)$$

A reasonable estimate of the maximum gradient in the direction of motion can be calculated as:

$$G < (0.1\ B_1)/(v \times t) \qquad (13)$$

For practical values of RF magnetic field amplitude, $B_1$, in the range of $2 \times 10^{-4}$ T, and tool speed, v, of about 0.05 m/sec, during a time of 200 milliseconds for a typical measurement sequence the gradient, G, should be less than about $2 \times 10^{-3}$ T/m (equivalent to about 0.2 Gauss/cm). This value was used as a constraint in the procedure for optimizing the shape of the static magnetic field.

It is common for the logging instrument velocity perpendicular to the longitudinal axis 78 to be about 50 times less than the logging speed. This requires the static magnetic field amplitude gradient perpendicular to the longitudinal axis 78 (the radial component of the gradient) to be less than 0.1 T/m. The preferable geometry of the magnet as shown in FIG. 6 has a radial static magnetic field amplitude gradient of 0.02 T/m (2 Gauss/cm). Other values of the radial gradient may be selected by changing the frequency of the RF magnetic field.

The design requirements for the radial static magnetic field gradient are also affected by the earth's magnetic field $H_e$, which may vary in value and direction as a function of geographical location of the wellbore and the geographic direction that the wellbore is drilled. Earth's magnetic field is substantially homogeneous and is about $0.5 \cdot 10^{-4}$ T in magnitude. Any static magnetic field variation resulting from variation in the logging instrument orientation with respect to the earth's magnetic field should not significantly change the radius, $R_{sv}$, of the sensitive volume 58. The shift may be expressed as the ratio $H_e/G$. Therefore, the required radial static magnetic field amplitude gradient, G, should satisfy the inequality $H_e/G << R_{sv}$ or $G >> H_e/R_{sv}$. For $R_{sv}=0.1$ m, then G should be greater than about $5 \times 10^{-4}$ T/m. As a practical matter the existing radial gradient of the static magnetic field of the preferred embodiment of the magnet ($2 \times 10^{-2}$ T/m, or 2 Gauss/cm) more than meets this requirement. These gradient requirements are a function of the operating specifications of the NMR well logging instrument such as logging speed, depth of investigation, vertical resolution, and signal-to-noise ratio. Therefore, the specific embodiment and apparatus parameters are a matter of convenience for the system designer and are not to be construed as limitations on the invention.

It will be readily appreciated by persons skilled in the art that the invention is not limited to what has been particularly shown and described herein. Rather the scope of the invention should be limited only by the claims which follow.

What is claimed is:

1. A nuclear magnetic resonance well logging apparatus, comprising:

a magnet for inducing a static magnetic field in earth formations penetrated by a wellbore, said magnet polarized along a longitudinal axis of said apparatus, said static magnetic field having a sensitive volume within a substantially cylindrical sector on one side of the wellbore, said sector having a longitudinal axis substantially parallel to said longitudinal axis of the wellbore and a maximum longitudinal amplitude gradient related to an expected speed of motion of said apparatus along said wellbore;

a transmitter for inducing a radio frequency magnetic field in said sector, said radio frequency magnetic field polarized substantially orthogonally to said static magnetic field, said static magnetic field and said radio frequency magnetic field particularly shaped to excite nuclei within said sector; and a receiver for detecting nuclear magnetic resonance signals from said sector.

2. The apparatus as defined in claim 1 wherein said static magnetic field has a maximum radial amplitude gradient in said sector related to an expected speed of motion of said apparatus perpendicular to said longitudinal axis.

3. The apparatus as defined in claim 1 wherein said static magnetic field has a minimum radial amplitude gradient in said sector to substantially avoid distortion of said static magnetic field in said sector by the earth's magnetic field.

4. The apparatus as defined in claim 1 wherein said static magnetic field has a longer dimension in a direction of motion of said apparatus along said wellbore than an active length of said transmitter, and said transmitter has a longer active length along said direction of motion than an active length of said receiver, whereby said nuclei excited by said radio frequency magnetic field are substantially completely polarized by said static magnetic field and said nuclear magnetic resonance signals are received by substantially fully radio frequency-excited nuclei.

5. The apparatus as defined in claim 1 wherein said transmitter comprises:

two substantially identical antennas each having a sensitive axis rotated 90 degrees with respect to the other, said antennas each energized by a radio frequency power source having a 90 degree phase shift with respect to the other said power source to induce a circularly polarized radio frequency magnetic field in said sector; and said receiver comprises two substantially identical antennas each having a sensitive axis rotated 90 degrees with respect to the other, said receiver including circuits for phase-sensitive quadrature detection of the NMR signals connected to said receiver antennas.

6. The apparatus as defined in claim 1 wherein said magnet comprises a first magnet cylinder and a second magnet cylinder, said second magnet cylinder disposed in a recess formed in said first magnet cylinder, said recess substantially parallel to said longitudinal axis and disposed to one side of said first cylinder, said first and said second cylinders polarized substantially parallel to said longitudinal axis an in opposite directions.

7. The apparatus as defined in claim 6 wherein said first cylinder and said second cylinder comprises a substantially radio frequency transparent magnet material.

8. The apparatus as defined in claim 1 wherein said transmitter comprises an antenna having a sensitive axis orthogonal to that of an antenna forming part of said receiver, whereby substantially no signal is induced directly into said receiver antenna by radiation from said transmitter antenna.

9. The apparatus as defined in claim 1 wherein said sector subtends a maximum possible angle consistent with providing substantially no contact of any part of said sector with said wellbore.

\* \* \* \* \*